(12) United States Patent
Zukerman et al.

(10) Patent No.: US 11,228,523 B2
(45) Date of Patent: Jan. 18, 2022

(54) INFRASTRUCTURE LINK PATH ARRANGEMENT DETERMINATION METHOD AND SYSTEM

(71) Applicant: City University of Hong Kong, Kowloon (HK)

(72) Inventors: Moshe Zukerman, Kowloon (HK); Zengfu Wang, Xi'an (CN); Qing Wang, Kowloon (HK); William Moran, Balwyn (AU); Xinyu Wang, Kowloon (HK); Elias Tahchi, Quarry Bay (HK); Fu Chu Leung, Kowloon (HK)

(73) Assignee: City University of Hong Kong, Kowloon (HK)

( * ) Notice: Subject to any disclaimer, the term of this patent is extended or adjusted under 35 U.S.C. 154(b) by 0 days.

(21) Appl. No.: 16/889,651

(22) Filed: Jun. 1, 2020

(65) Prior Publication Data
US 2021/0377147 A1    Dec. 2, 2021

(51) Int. Cl.
*H04L 12/751* (2013.01)
*H04L 12/729* (2013.01)
(Continued)

(52) U.S. Cl.
CPC .............. *H04L 45/02* (2013.01); *H04L 45/04* (2013.01); *H04L 45/122* (2013.01); *H04L 45/124* (2013.01); *H04L 45/125* (2013.01)

(58) Field of Classification Search
CPC ....... H04L 45/02; H04L 45/04; H04L 45/122; H04L 45/125; H04L 41/0836; H04L 41/0826; H04L 41/145; H04L 45/124; H04L 61/1511; H04L 67/12; H04L 65/4084; H04L 29/06; H04L 41/0631; H04L 41/12; H04L 67/10; H04L 29/12066; H04L 65/605; G06Q 10/06313; G06Q 50/08; H04N 21/2402; H04N 1/00127; H04W 64/00; H04W 74/0833
See application file for complete search history.

(56) References Cited

U.S. PATENT DOCUMENTS

| | | | |
|---|---|---|---|
| 7,164,883 B2 * | 1/2007 | Rappaport | G06Q 10/10 455/3.01 |
| 8,994,591 B2 * | 3/2015 | Dupray | H04W 4/90 342/457 |

(Continued)

OTHER PUBLICATIONS

Wang, Z., et al., "Application of the Fast Marching Method for Path Planning of Long-haul Optical Fiber Cables With Shielding" IEEE Access, vol. 6, 2018, pp. 41367-41378.

(Continued)

*Primary Examiner* — Wutchung Chu
(74) *Attorney, Agent, or Firm* — Renner Kenner Greive Bobak Taylor & Weber (57) ABSTRACT

A computer-implemented method and system for determining a path arrangement of an infrastructure link. The method includes receiving one or more inputs each indicative of a constraint; and processing the one or more inputs and a set of data based on a path arrangement determination model. The set of data includes data representing one or more factors affecting the path arrangement. The method also includes determining, based on the processing, the path arrangement of the infrastructure link.

24 Claims, 4 Drawing Sheets

(51) Int. Cl.
*H04L 12/721* (2013.01)
*H04L 12/715* (2013.01)
*H04L 12/733* (2013.01)

(56) References Cited

U.S. PATENT DOCUMENTS

| | | | | |
|---|---|---|---|---|
| 10,506,312 | B1* | 12/2019 | Innes | H04B 10/25 |
| 10,693,737 | B1* | 6/2020 | Teflian | H04L 41/145 |
| 2003/0023412 | A1* | 1/2003 | Rappaport | H04W 16/20 |
| | | | | 703/1 |
| 2004/0198386 | A1* | 10/2004 | Dupray | H04W 64/00 |
| | | | | 455/456.1 |
| 2004/0236547 | A1* | 11/2004 | Rappaport | H04L 43/00 |
| | | | | 703/2 |
| 2004/0266457 | A1* | 12/2004 | Dupray | G01S 5/0278 |
| | | | | 455/456.5 |
| 2005/0138578 | A1* | 6/2005 | Alpert | G06F 30/394 |
| | | | | 716/114 |
| 2011/0063292 | A1* | 3/2011 | Holl | G01V 11/00 |
| | | | | 345/420 |
| 2013/0096976 | A1* | 4/2013 | Alpert | G06Q 10/0631 |
| | | | | 705/7.23 |
| 2019/0116090 | A1* | 4/2019 | Zukerman | H04L 45/124 |
| 2020/0267058 | A1* | 8/2020 | Gray | H04W 24/02 |

OTHER PUBLICATIONS

Wang, Z., et al., "A Seismic Resistant Design Algorithm for Laying and Shielding of Optical Fiber Cables" IEEE/OSA Journal of Lightwave Technology, vol. 35, 2017, No. 14, pp. 3060-3074.
Wang, Z., et al., "Multiobjective Path Optimization for Critical Infrastructure Links with Consideration to Seismic Resilience" Computer-Aided Civil and Infrastructure Engineering, vol. 32, 2017, pp. 836-855.
Wang, Z., et al., "Terrain Constrained Path Planning for Long-haul Cables," Optics Express, vol. 27, No. 6, 2019, pp. 8221-8235.
Wang, Q., et al., "Cost-Effective Path Planning for Submarine Cable Network Extension," IEEE Access, vol. 7, 2019, pp. 61883-61895.

* cited by examiner

Figure 3

INFRASTRUCTURE LINK PATH ARRANGEMENT DETERMINATION METHOD AND SYSTEM

TECHNICAL FIELD

The invention relates to an infrastructure link path arrangement determination method and system.

BACKGROUND

Infrastructures such as electricity/power systems, oil systems, water systems, fuel systems, gas, systems, communications systems, transportation systems, etc., are essential to the proper functioning of modern economies and societies. As the world becomes increasingly interconnected, cross-area, trans-regional, trans-national, or even trans-continental infrastructure links becomes increasingly important.

One specific type of infrastructure link is submarine telecommunications cable system. Such cable system currently spans over a million km worldwide, and it is expected to reach two million km in the foreseeable future. As one would expect, a substantial amount of cost will have to be spent on the development and maintenance of the worldwide submarine cable infrastructure. The determination of the arrangement of submarine cable infrastructure is complicated, as it may depend on cost factors as well as various environmental and human factors which present risks that may affect integrity, performance, ease of arrangement, repair, etc., of the infrastructure. Natural disasters (such as earthquake, volcanic activity, landslides, turbid flows) and human activities (such as fishing, mooring, resource exploration) may all potentially damage the cables. The cables, if damaged, will catastrophically disrupt telecommunication services (e.g., internet connectivity) in or across different areas, regions, or even countries.

There remains a need to reliably determine a path arrangement of infrastructure links in view of various competing factors in a resource- and/or time-efficient manner.

SUMMARY OF THE INVENTION

In a first aspect of the invention, there is provided a computer-implemented method for determining a path arrangement of an infrastructure link. The method includes receiving one or more inputs each indicative of a constraint; and processing the one or more inputs and a set of data based on a path arrangement determination model. The set of data includes data representing one or more factors affecting the path arrangement. The method also includes determining, based on the processing, the path arrangement of the infrastructure link.

In one embodiment of the first aspect, the processing comprises: iteratively processing the set of data at increasing resolution or size based on the path arrangement determination model. The number of iterations in the iteratively processing step may be predetermined. The number of iterations in the iteratively processing step may be fixed or may be adjustable. The one or more inputs may include an input indicative of a set number of iteration (the number of iteration as a constraint on the number of iterations).

In one embodiment of the first aspect, the processing comprises: (a): processing the one or more inputs and the set of data at a first resolution or size based on the path arrangement determination model to determine an intermediate path arrangement; and (b): after step (a), processing the one or more inputs and at least some of the set of data at a second resolution or size higher than the first resolution or size based on the path arrangement determination model and the intermediate path arrangement.

In one embodiment of the first aspect, in step (b), the set of data that is processed at the second resolution or size only includes data associated with the determined intermediate path arrangement. The data associated with the determined intermediate path arrangement may be data at or near the location of the determined intermediate path arrangement. The other of the set of data is either discarded (e.g., by segmentation) or processed at a resolution or size lower than the second resolution or size. The resolution or size lower than the second resolution or size may be the first resolution or size. The processing may further include, before step (b), processing the set of data such that some of the data is at the second resolution or size and some of the data is at a resolution or size lower than the second resolution or size. The processing may include reducing resolution or size of some of the set of data. The resolution reduction may be by spatial averaging.

In one embodiment of the first aspect, in step (b), the processing is performed in segments along the determined intermediate path arrangement.

In one embodiment of the first aspect, prior to the processing, the set of data is at a resolution or size higher than the first resolution or size.

In one embodiment of the first aspect, prior to the processing, the set of data is at a resolution or size higher than the second resolution or size.

In one embodiment of the first aspect, step (b) determines a further intermediate path arrangement; and the processing further comprises: (c): after step (b), processing the one or more inputs and at least some of the set of data at a third resolution or size higher than the second resolution or size based on the path arrangement determination model and the further intermediate path arrangement.

In one embodiment of the first aspect, in step (c), the set of data that is processed at the second resolution or size only includes data associated with the determined further intermediate path arrangement. The data associated with the determined further intermediate path arrangement may be data at or near the location of the determined further intermediate path arrangement. The other of the set of data is either discarded (e.g., by segmentation) or processed at a resolution or size lower than the second resolution or size. The resolution or size lower than the third resolution or size may be the second resolution or size or the first resolution or size. The processing may further include, before step (c), processing the set of data such that some of the data is at the third resolution or size and some of the data is at a resolution or size lower than the third resolution or size. The processing may include reducing resolution or size of some of the set of data. The resolution reduction may be by spatial averaging.

In one embodiment of the first aspect, in step (c), the processing is performed in segments along the further intermediate path arrangement.

In one embodiment of the first aspect, the processing is performed on one or more processors using a parallel processing method. The processing may be performed on multiple processors, e.g., multiple processors that are operably connected with each other. The multiple processors may optionally form a distributed computing system.

In one embodiment of the first aspect, the path arrangement determination model is based on fast marching method. In this case if a parallel processing method is used, the parallel processing method includes a distributed-memory parallel computation method.

In one embodiment of the first aspect, the one or more factors include environmental factors and human factors. The one or more factors may include one or more quantified geographic attributes of a geographic terrain in which the infrastructure link can be or is to be arranged. The one or more quantified geographic attributes may include topographical attributes or seismological attributes. The topographical attributes may, for example, be elevation attributes and/or bathymetry attributes. The seismological attributes may represent seismic-activities related hazard such as earthquake hazard.

In one embodiment of the first aspect, the one or more inputs comprise an input indicative of a (e.g., quantified) risk-level related constraint, and the determined path arrangement represents a path arrangement of least cost with respect to a predetermined risk level.

In one embodiment of the first aspect, the one or more inputs comprise an input indicative of a (e.g., quantified) cost related constraint, and the determined path arrangement represents a path arrangement of lowest risk level with respect to a predetermined cost.

In one embodiment of the first aspect, the one or more inputs comprise an input indicative of a (e.g., quantified) protection level related constraint, and the determined path arrangement represents a path arrangement of least cost or least risk-level with respect to a predetermined protection level.

In one embodiment of the first aspect, the path arrangement includes a path network with a plurality of paths or connected paths. Each of the paths may be formed by one or more curved or straight segments, optionally with branching. The plurality of connected paths may be connected to an existing infrastructure link network.

In one embodiment of the first aspect, the path arrangement includes a single path. The single path may be formed by one or more curved or straight segments, optionally with branching. In one example, the single path is a path connected to an existing infrastructure link network. In another example, the single path is a new path between two predetermined geographic locations, optionally with predetermined intermediate geographic location(s) through which the path has to pass.

In one embodiment of the first aspect, the path arrangement includes multiple possible paths. Each of the possible paths may be formed by one or more curved or straight segments, optionally with branching. Each of the possible paths may pass through two or more predetermined points (including the endpoints).

In one embodiment of the first aspect, the infrastructure link includes a cable, a pipeline, or a transportation link. The cable may be a power cable, a data cable, or a communication cable. The pipeline may be a liquid pipeline (i.e., one that transports liquid) or a gas pipeline (i.e., one that transports gas). The transportation link may be a road, a walkway, or a railway. In one specific example, the infrastructure link includes a telecommunication cable, optionally at least partly offshore.

In one embodiment of the first aspect, the computer-implemented method also includes modelling a geographic terrain in which the path arrangement of the infrastructure link is to be arranged. The geographic terrain may include onshore, offshore, land, and/or sub-sea terrain. The modelling may include modelling the geographic terrain into a terrain model with multiple nodes. The geographic terrain may be modeled as a triangulated piecewise-linear 2D manifold.

In one embodiment of the first aspect, the computer-implemented method also includes presenting the determined path arrangement. Presenting the determined path arrangement may include displaying, on a display, the determined path arrangement.

The determined path arrangement may be overlaid on a map, such as a map of the modelled geographic terrain.

In a second aspect of the invention, there is provided a system for determining a path arrangement of an infrastructure link. The system includes one or more processors arranged to: receive one or more inputs each indicative of a constraint; and process the one or more inputs and a set of data based on a path arrangement determination model. The set of data includes data representing one or more factors affecting the path arrangement. The one or more processors are also arranged to determine, based on the processing, the path arrangement of the infrastructure link.

In one embodiment of the second aspect, the one or more processors are arranged to iteratively process the set of data at increasing resolution or size based on the path arrangement determination model. The number of iterations in the iteratively processing step may be predetermined. The number of iterations in the iteratively processing step may be fixed or may be adjustable. The one or more inputs may include an input indicative of a set number of iteration (the number of iteration as a constraint on the number of iterations).

In one embodiment of the second aspect, the one or more processors are arranged to (a): process the one or more inputs and the set of data at a first resolution or size based on the path arrangement determination model to determine an intermediate path arrangement; and (b): after (a), process the one or more inputs and at least some of the set of data at a second resolution or size higher than the first resolution or size based on the path arrangement determination model and the intermediate path arrangement.

In one embodiment of the second aspect, in (b), the set of data that is processed at the second resolution or size only includes data associated with the determined intermediate path arrangement. The data associated with the determined intermediate path arrangement may be data at or near the location of the determined intermediate path arrangement. The other of the set of data is either discarded (e.g., by segmentation) or processed at a resolution or size lower than the second resolution or size. The resolution or size lower than the second resolution or size may be the first resolution or size. The one or more processors may be arranged to, before (b), process the set of data such that some of the data is at the second resolution or size and some of the data is at a resolution or size lower than the second resolution or size. The one or more processors may be arranged to reduce resolution or size of some of the set of data.

In one embodiment of the second aspect, in (b), the one or more processors are arranged to perform the processing in segments along the determined intermediate path arrangement.

In one embodiment of the second aspect, prior to the processing, the set of data is at a resolution or size higher than the first resolution or size.

In one embodiment of the second aspect, prior to the processing, the set of data is at a resolution or size higher than the second resolution or size.

In one embodiment of the second aspect, the one or more processors, in (b), determine a further intermediate path arrangement; and the one or more processors are further arranged to: (c): after (b), process the one or more inputs and at least some of the set of data at a third resolution or size higher than the second resolution or size based on the path arrangement determination model and the further intermediate path arrangement.

In one embodiment of the second aspect, in (c), the set of data that is processed at the second resolution or size only includes data associated with the determined further intermediate path arrangement. The data associated with the determined further intermediate path arrangement may be data at or near the location of the determined further intermediate path arrangement. The other of the set of data is either discarded (e.g., by segmentation) or processed at a resolution or size lower than the second resolution or size. The resolution or size lower than the third resolution or size may be the second resolution or size or the first resolution or size. The one or more processors may be arranged to, before (c), process the set of data such that some of the data is at the third resolution or size and some of the data is at a resolution or size lower than the third resolution or size. The one or more processors may be arranged to reduce resolution or size of some of the set of data.

In one embodiment of the second aspect, in (c), the one or more processors are arranged to perform the processing in segments along the further intermediate path arrangement.

In one embodiment of the second aspect, the one or more processors are arranged to use a parallel processing method to perform the processing. The one or more processors may be multiple processors, e.g., multiple processors that are operably connected with each other. The multiple processors may optionally form a distributed computing system.

In one embodiment of the second aspect, the path arrangement determination model is based on fast marching method. In this case if a parallel processing method is used, the parallel processing method includes a distributed-memory parallel computation method.

In one embodiment of the second aspect, the one or more factors include environmental factors and human factors. The one or more factors may include one or more quantified geographic attributes of a geographic terrain in which the infrastructure link can be or is to be arranged. The one or more quantified geographic attributes may include topographical attributes or seismological attributes. The topographical attributes may, for example, be elevation attributes and/or bathymetry attributes. The seismological attributes may represent seismic-activities related hazard such as earthquake hazard.

In one embodiment of the second aspect, the one or more inputs comprise an input indicative of a (e.g., quantified) risk-level related constraint, and the determined path arrangement represents a path arrangement of least cost with respect to a predetermined risk level.

In one embodiment of the second aspect, the one or more inputs comprise an input indicative of a (e.g., quantified) cost related constraint, and the determined path arrangement represents a path arrangement of lowest risk level with respect to a predetermined cost.

In one embodiment of the second aspect, the one or more inputs comprise an input indicative of a (e.g., quantified) protection level related constraint, and the determined path arrangement represents a path arrangement of least cost or least risk-level with respect to a predetermined protection level.

In one embodiment of the second aspect, the path arrangement includes a path network with a plurality of paths or connected paths. Each of the paths may be formed by one or more curved or straight segments, optionally with branching. The plurality of connected paths may be connected to an existing infrastructure link network.

In one embodiment of the second aspect, the path arrangement includes a single path. The single path may be formed by one or more curved or straight segments, optionally with branching. In one example, the single path is a path connected to an existing infrastructure link network. In another example, the single path is a new path between two predetermined geographic locations, optionally with predetermined intermediate geographic location(s) through which the path has to pass.

In one embodiment of the second aspect, the path arrangement includes multiple possible paths. Each of the possible paths may be formed by one or more curved or straight segments, optionally with branching. Each of the possible paths may pass through two or more predetermined points (including the endpoints).

In one embodiment of the second aspect, the infrastructure link includes a cable, a pipeline, or a transportation link. The cable may be a power cable, a data cable, or a communication cable. The pipeline may be a liquid pipeline (i.e., one that transports liquid) or a gas pipeline (i.e., one that transports gas). The transportation link may be a road, a walkway, or a railway. In one specific example, the infrastructure link includes a telecommunication cable, optionally at least partly offshore.

In one embodiment of the second aspect, the one or more processors are further arranged to a geographic terrain in which the path arrangement of the infrastructure link is to be arranged. The geographic terrain may include onshore, offshore, land, and/or sub-sea terrain. The modelling may include modelling the geographic terrain into a terrain model with multiple nodes. The geographic terrain may be modeled as a triangulated piecewise-linear 2D manifold.

In one embodiment of the second aspect, the system also includes an output device for presenting the determined path arrangement. The output device may be a display arranged to present the determined path arrangement by displaying the determined path arrangement. The determined path arrangement may be overlaid on a map, such as a map of the modelled geographic terrain.

In a third aspect of the invention, there is provided a non-transitory computer readable medium for storing computer instructions that, when executed by one or more processors, causes the one or more processors to perform the method of the first aspect.

In a fourth aspect of the invention, there is provided an article comprising the non-transitory computer readable medium of the third aspect.

In a fifth aspect of the invention, there is provided a computer program product storing instructions and/or data that are executable by one or more processors, the instructions and/or data are arranged to cause the one or more processors to perform the method of the first aspect.

BRIEF DESCRIPTION OF THE DRAWINGS

Embodiments of the invention will now be described, by way of example, with reference to the accompanying drawings in which.

DETAILED DESCRIPTION

One or more of the inventors of this invention have devised various computer-implemented methods and systems for infrastructure link path planning. These work include U.S. Non-Provisional patent application Ser. No. 15/785,793, filed on 17 Oct. 2017, entitled "Method for Determining Optimal Laying Arrangement of Infrastructure Link", granted as U.S. Pat. No. 10,425,280; U.S. Non-Provisional patent application Ser. No. 15/992,480, filed on 30 May 2018, entitled "System and Method for Determining Optimal Path Arrangements for an Infrastructure Link with Two or More Design Levels"; U.S. Non-Provisional patent application Ser. No. 15/992,559, filed on 30 May 2018, entitled "System and Method for Determining Optimal Path Arrangements for an Infrastructure Link with Terrain Slope Consideration"; U.S. Non-Provisional patent application Ser. No. 16/123,471, filed on 6 Sep. 2018, entitled "System and Method for Analyzing Survivability of an Infrastructure Link"; and U.S. Non-Provisional patent application Ser. No. 16/265,337, filed on 1 Feb. 2019, entitled "System and Method for Determining an Optimal Path Arrangement of an Infrastructure Link Network", the entire contents of each and all of these five US non-provisional patent applications are incorporated herein by reference.

The inventors of this invention have realized, through research, experiments, and/or trials, that existing methods for infrastructure link path planning face a significant difficulty associated with the massive amount of data required to be processed for determining the suitable path arrangement in view of various factors and constraints. The inventors have recognized that the search for high-quality (refined, accurate, etc.) path design generally requires a large amount of data, which results in computational problems that may be difficult if not impossible to solve (considering computing time and/or computation resource).

Figure 1:
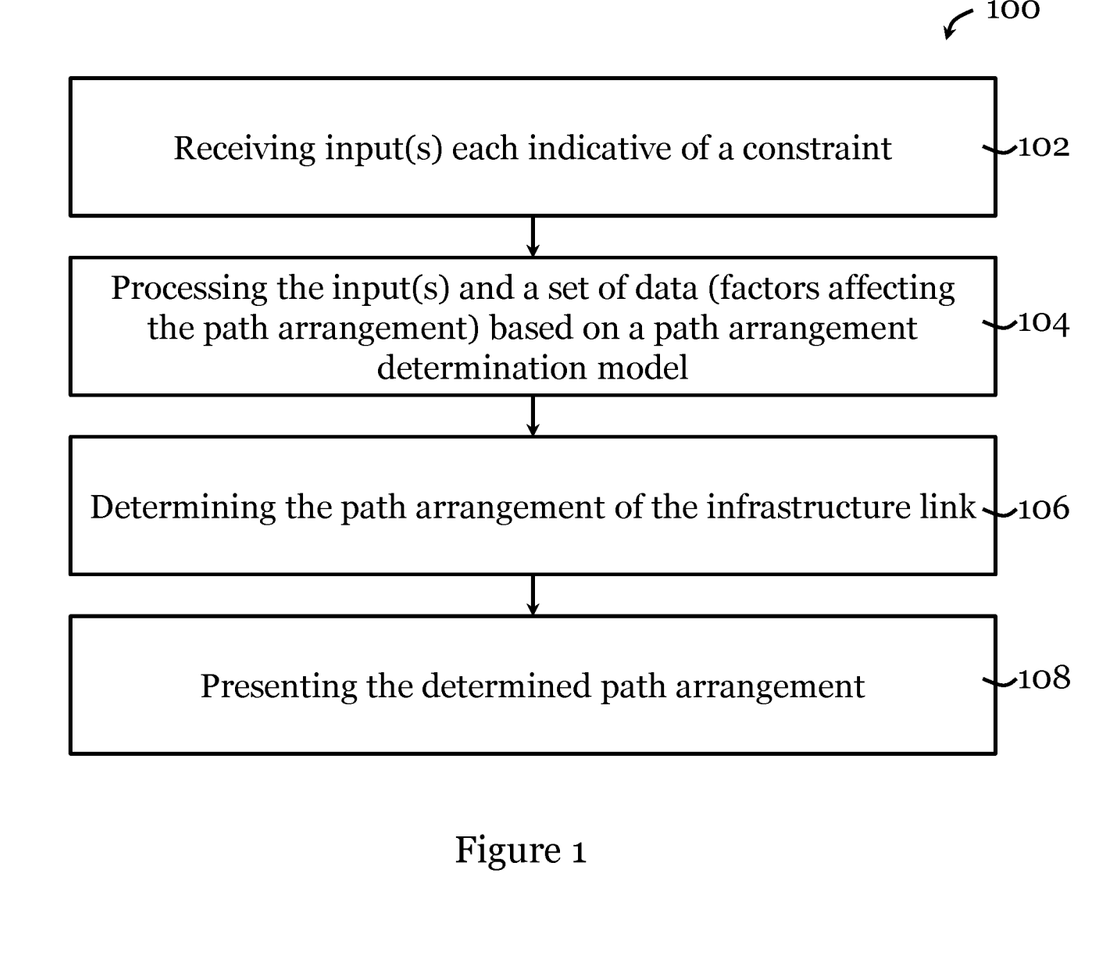
FIG. 1 is a flowchart of a method for determining a path arrangement of an infrastructure link in one embodiment of the invention.

FIG. 1 is a method 100 for determining a path arrangement of an infrastructure link in one embodiment of the invention. The method 100 begins in step 102, in which one or more inputs, each indicative of a constraint, is received. The input(s) may be received by one or more processors via a user interface (e.g., input device). The input may include an input indicative of a (e.g., quantified) risk-level related constraint, an input indicative of a (e.g., quantified) cost related constraint, and/or an input indicative of a (e.g., quantified) protection level related constraint. The determined path arrangement may represent a path arrangement of least cost with respect to a predetermined risk level, a path arrangement of lowest risk level with respect to a predetermined cost, and/or a path arrangement of least cost or least risk-level with respect to a predetermined protection level.

Subsequently, in step 104, the method 100 then processes the one or more inputs and a set of data based on a path arrangement determination model. The set of data includes data representing one or more factors affecting the path arrangement. The factors may include environmental factors and human factors. The factors may include one or more quantified geographic attributes of a geographic terrain in which the infrastructure link can be or is to be arranged. The one or more quantified geographic attributes may include topographical attributes or seismological attributes. The topographical attributes may, for example, be elevation attributes and/or bathymetry attributes. The seismological attributes may represent seismic-activities related hazard such as earthquake hazard. The path arrangement determination model may be based on fast marching method or the methods disclosed in the US non-provisional patent applications which have been entirely incorporated herein by reference. The processing step may also include modelling a geographic terrain in which the path arrangement of the infrastructure link is to be arranged. The geographic terrain may include onshore, offshore, land, and/or sub-sea terrain. The modelling may include modelling the geographic terrain into a terrain model with multiple nodes, e.g., as a triangulated piecewise-linear 2D manifold, as disclosed in the US non-provisional patent applications which have been entirely incorporated herein by reference.

In step 106, the method 100 determines the path arrangement of the infrastructure link based on the processing.

In step 108, the determined path arrangement is presented. In one example, the presentation may include displaying the determined path arrangement on a display. The determined path arrangement may be overlaid on a map of the modelled geographic terrain.

Figure 2:
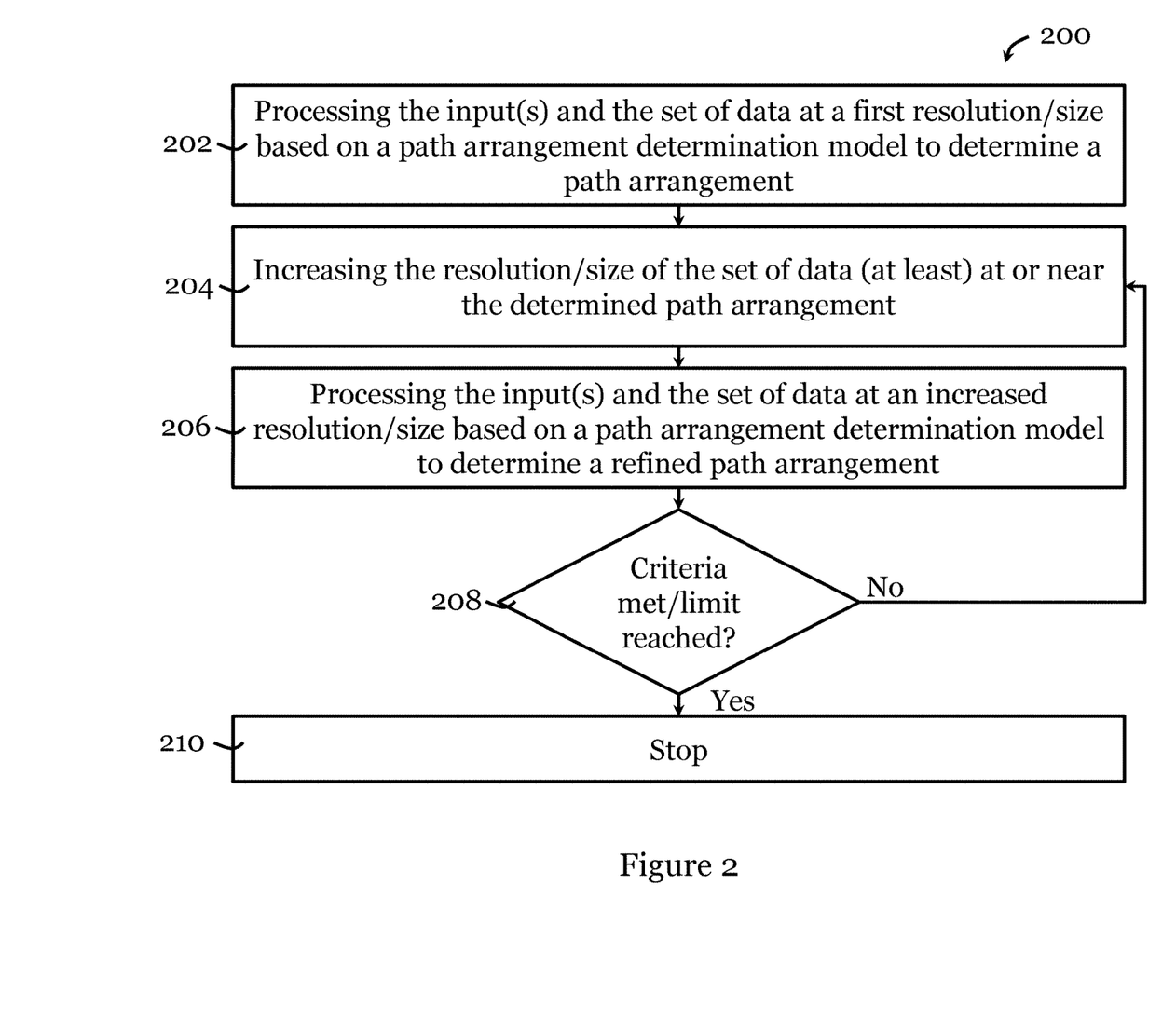
FIG. 2 is a flowchart of a method for determining a path arrangement of an infrastructure link in one embodiment of the invention.

FIG. 2 is a method 200 for determining a path arrangement of an infrastructure link in one embodiment of the invention. The method 200 may be part of the method step 104 in the method 100 of FIG. 1. Broadly speaking, the method 200 involves iteratively processing the set of data at increasing resolution or size based on the path arrangement determination model.

The method 200 begins in step 202, in which the input(s) and the set of data at a first resolution or size is processed based on the path arrangement determination model to determine a path arrangement. As mentioned, the path arrangement determination model may be based on fast marching method or the methods disclosed in the US non-provisional patent applications which have been entirely incorporated herein by reference.

After the path arrangement is determined, in step 204, the method 200 increases the resolution or size of at least part of the set of data, the at least part of the set of data includes data at or near the determined path arrangement. Optionally, the method maintains or decreases the resolution or size of, or discards the other part of the set of data. The increase in resolution or size may be performed segment-wise along the path arrangement determined in step 202.

Then, in step 206, the input(s) and the set of data (i.e., the at least part of the 35 data which has been processed to have increased resolution/size) is processed based on the path arrangement determination model to determine a refined path arrangement. The refined path arrangement represents a more accurate path arrangement than the path arrangement determined in step 202. The path arrangement determination model is substantially the same as the path arrangement determination model used in step 202.

After the refined path arrangement is determined, in step 208, a determination is made as to whether a predefined iteration completion criteria or iteration limit is reached. The iteration limit may be part of the input. If the criterion is met or the iteration limit is reached, the method 200 then stops the processing in step 210. In one example, after step 210, the method 200 may then return to step 106 or 108 of method 100 of FIG. 1. Alternatively, if the criterion is not met or the iteration limit is not reached, the method 200 will return to step 204, which further increases the resolution or size of at least part of the set of data, the at least part of the set of data includes data at or near the latest determined refined path arrangement. The increase in resolution or size may be linear or non-linear.

In method 200, the set of data used is initially at a high resolution, and the method 200 processes it first using its low resolution version (for increased computation speed) and subsequently using increasingly-higher resolution version(s) (for increased accuracy). In method 200, the set of data may be down-sampled, down-sized, or spatially averaged to reduce its resolution or size. The reduction is resolution or size may be local (specific areas) or global (applies to all data).

The set of data used in the methods 100, 200 may be obtained from public domain or private enterprises. For example, the set of data may include topographic and seismological data obtained from publicly available sources such as National Oceanic and Atmospheric Administration (NASA, https://data.nasa.gov/), the General Bathymetric Chart of the Oceans (GEBCO, https://www.gebco.net/) and the United States Geological Survey (USGS, https://www.usgs.gov/). The set of data may include high resolution global digital elevation data sampled at 1 arc-second of latitude and longitude (about 30 meters) obtained by NASA, available on the USGS Earth Explorer. The set of data may include bathymetry data for the world's oceans at 15 arc-second intervals, obtained from GEBCO. The set of data may include extensive gridded data of seismic hazard for US and some other regions outside the US, available from USGS, with 30 arc-second increments in longitude and latitude. The set of data may include data from other sources, for example, http://gmo.gfz-potsdam.de and https://maps.openquake.org, which provide global seismic hazard maps. These seismic hazard maps mainly cover on-shore areas. The set of data may include information on tectonics, global fault locations, past history of earthquakes and ground shaking produced by past earthquakes, landslides, and locations of volcanoes etc., provided by USGS. The set of data may include confidential private data form private enterprises concerning sediment hardness, fishing areas, environmentally sensitive areas, military areas, resource mining areas. The set of data may include bathymetry data at 10 meters intervals in specific regions in the areas where the private enterprises laid cables. Information of submarine cables around the world that have been broken due to various reasons in the history may be used to help optimize the path planning.

The elevation data obtained from public domain or private enterprises may be further processed to improve useability. For example, the coordinate transformation for the geographic data may be applied to convert the elevation data from latitude and longitude coordinates to Universal Transverse Mercator coordinates. A triangulated piecewise-linear two-dimensional manifold M can then be used to approximate the earth's landforms. Elevation data from different data sources may be integrated.

Various factors can be quantified for use in the above embodiments. In one example, to quantify earthquake hazards, cable breakage risk is measured using the commonly used metric in the field of earthquake engineering known as the number of potential repairs (or failures), which has a well-established, statistically validated relationship with ground motion intensities. Attributes of geographical locations, such as seismic hazards, slope, fishing activities, areas of ecological value, existing submarine cables and pipelines, etc., may be considered. Additional protection (reinforcement, armour, shielding or extra material) may improve cable resilience in certain hazardous areas, but with additional upfront cost. Different levels of protection for submarine fiber cables, varying with sea depth, are available through different armour strengths. The construction cost and breakage risk models may take account of the protection level.

The inventions disclosed in the US non-provisional patent applications which have been entirely incorporated herein by reference alleviated the computation difficulties associated with a large search space, e.g., by using FMM that finds shortest path over a continuous manifold. FMM achieves a significant reduction in run time compared to a raster-based algorithm that uses a discrete graph for modelling the earth's surface. However, with higher resolution (which enables better quality solutions), even using FMM, path planning for long haul cables may become even more difficult, because it becomes necessary to optimize cable path planning over a network with a large number of (e.g., billions of) nodes. Another difficulty is the requirement to load data of billions of nodes into the computer.

To this end, the multi-resolution approach in one implementation of the method 200 may be helpful. The approach, in one example, iteratively adjust the path by diluting (coarsening) the resolution of the used data in areas away from the current path and increasing the resolution closer to the current path. The path of a submarine cable is obtained first based on the low-resolution representation of the landforms. Then refinement is then done segment-wise along the path based on the high-resolution representation. The refinement may be repeated as needed.

In one implementation of the invention, parallel processing is applied for path optimization and for loading the data into the computer(s)/processor(s). The validation of the iterative localized multi-resolution methods using high performance machines will enable reduced complexity algorithms that are important when HPC facilities are unavailable. Note that FMM used for solving the Eikonal equation is inherently sequential and hence highly time-consuming. J. Yang, F. Stern, *A highly scalable massively parallel Fast Marching Method for the Eikonal equation, Journal of Computational Physics* 332 (2017) 333-362 has disclosed a domain decomposition method that can be used to realize highly scalable massively parallel computing of FMM, which uses a method of restarting narrow-band. This method is adopted in one embodiment of the invention to the infrastructure link planning problem due to the large geography datasets with billions of nodes. A distributed computing platform with high performance computers or supercomputers may be used to solve the problem by using a load balancing scheduler and different threads and nodes, where the nodes are interconnected with high-performance switches. The distributed-memory parallel computation for FMM as disclosed in Yang, F. Stern, *A highly scalable massively parallel Fast Marching Method for the Eikonal equation, Journal of Computational Physics* 332 (2017) 333-362 will be adopted in one embodiment of the invention.

Figure 3:
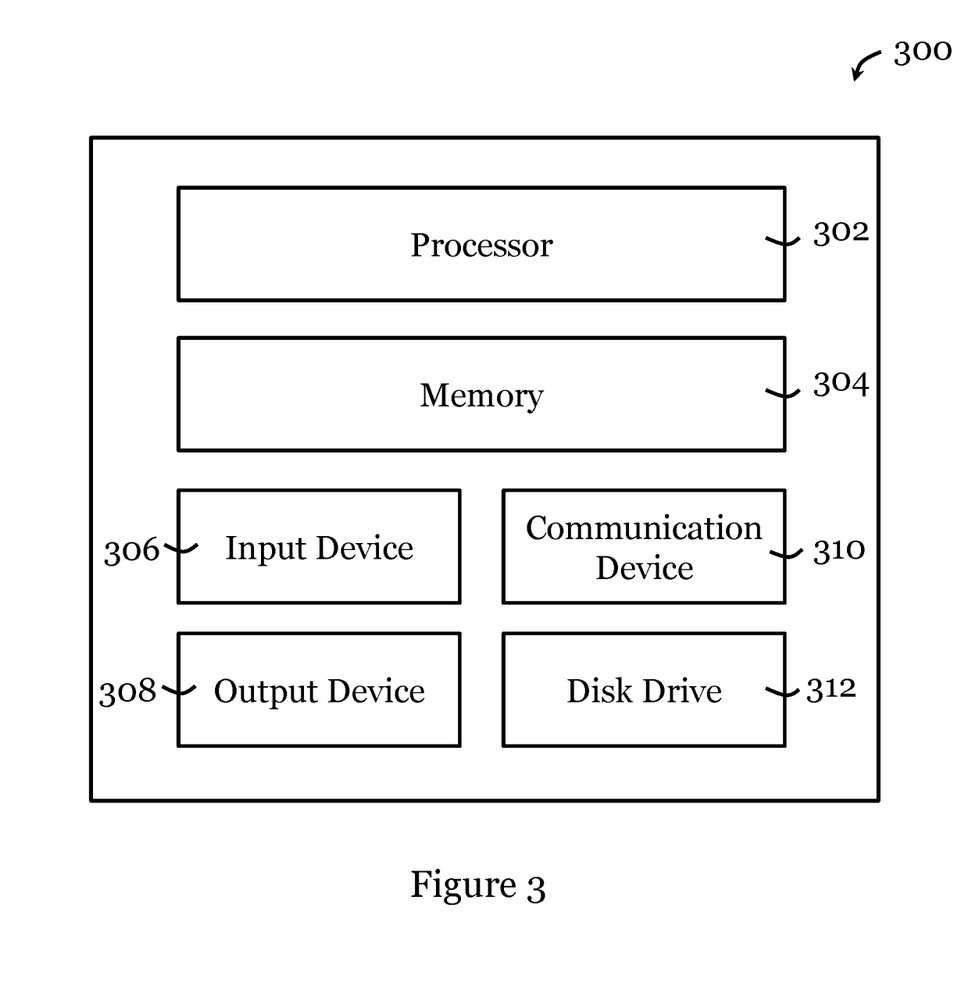
FIG. 3 is a block diagram of an information handling system operable to implement the method of FIG. 1 and/or the method of FIG. 2.

Referring to FIG. 3, there is shown a schematic diagram of an exemplary information handling system 300 that can be used as a server or other information processing systems in one embodiment of the invention. The information handling system 300 may be arranged to implement part or all of the method 100 of FIG. 1 and/or part or all of the method 200 of FIG. 2. The information handling system 300 may have different configurations, and it generally comprises suitable components necessary to receive, store, and execute appropriate computer instructions, commands, or codes. The main component of the information handling system 300 is a processor 302 and, optionally, a memory unit 304. The processor 302 may be formed by one or more of: CPU, MCU, controllers, logic circuits, Raspberry Pi chip, digital signal processor (DSP), application-specific integrated circuit (ASIC), Field-Programmable Gate Array (FPGA), or any other digital or analog circuitry configured to interpret and/or to execute program instructions and/or to process data. The memory unit 304 may include one or more volatile memory unit (such as RAM, DRAM, SRAM), one or more non-volatile memory unit (such as ROM, PROM, EPROM, EEPROM, FRAM, MRAM, FLASH, SSD, NAND, and NVDIMM), or any of their combinations. Preferably, the information handling system 300 further includes one or more input devices 306 such as a keyboard, a mouse, a stylus, an image scanner, a microphone, a tactile input device (e.g., touch sensitive screen), and an image/video input device (e.g., camera). The information handling system 300 may further include one or more output devices 308 such as one or more displays (e.g., monitor), speakers, disk drives, headphones, earphones, printers, 3D printers, etc. The display may include a LCD display, a LED/OLED display, or any other suitable display that may or may not be touch sensitive. The information handling system 300 may further include one or more disk drives 312 which may encompass solid state drives, hard disk drives, optical drives, flash drives, and/or magnetic tape drives. A suitable operating system may be installed in the information handling system 300, e.g., on the disk drive 312 or in the memory unit 304. The memory unit 304 and the disk drive 312 may be operated by the processor 302. The information handling system 300 also preferably includes a communication device 310 for establishing one or more communication links (not shown) with one or more other computing devices such as servers, personal computers, terminals, tablets, phones, or other wireless or handheld computing devices. The communication device 310 may be a modem, a Network Interface Card (NIC), an integrated network interface, a radio frequency transceiver, an optical port, an infrared port, a USB connection, or other wired or wireless communication interfaces. The communication links may be wired or wireless for communicating commands, instructions, information and/or data. Preferably, the processor 302, the memory unit 304, and optionally the input devices 306, the output devices 308, the communication device 310 and the disk drives 312 are connected with each other through a bus, a Peripheral Component Interconnect (PCI) such as PCI Express, a Universal Serial Bus (USB), an optical bus, or other like bus structure. In one embodiment, some of these components may be connected through a network such as the Internet or a cloud computing network. A person ordinarily skilled in the art would appreciate that the information handling system 300 shown in FIG. 3 is merely exemplary and different information handling systems 300 with different configurations may be applicable in the invention.

Figure 4:
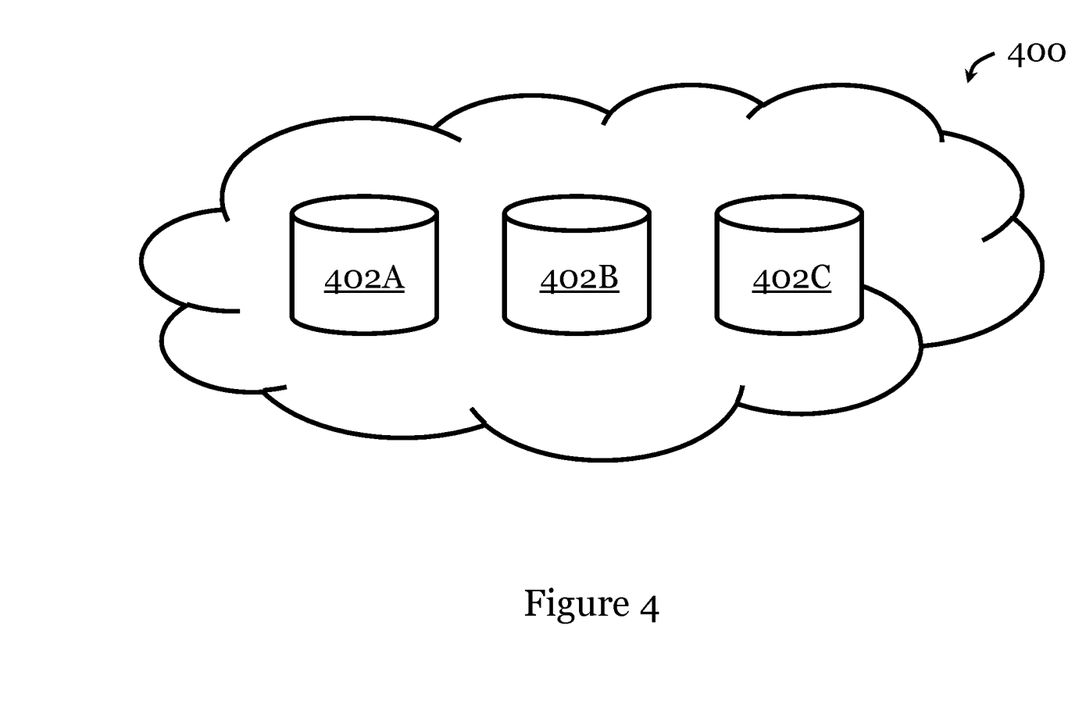
FIG. 4 is a schematic diagram of a system for determining a path arrangement of an infrastructure link in one embodiment of the invention.

FIG. 4 shows an exemplary system 400 for performing the method 100 of FIG. 1 and/or the method 200 of FIG. 2. The system 400 includes multiple (in this example, three) processors operably connected with each other for implementing a parallel processing method in performing the method 100 of FIG. 1 and/or the method 200 of FIG. 2. J. Yang, F. Stern, *A highly scalable massively parallel Fast Marching Method for the Eikonal equation, Journal of Computational Physics* 332 (2017) 333-362 has disclosed a domain decomposition method operable to realize the highly scalable massively parallel computing of fast marching method (one example of the basis of the path arrangement determination model). This method can be implemented using the system 400 for the distributed-memory parallel computation for fast marching method.

Although not required, the embodiments described with reference to the Figures can be implemented as an application programming interface (API) or as a series of libraries for use by a developer or can be included within another software application, such as a terminal or personal computer operating system or a portable computing device operating system. Generally, as program modules include routines, programs, objects, components and data files assisting in the performance of particular functions, the skilled person will understand that the functionality of the software application may be distributed across a number of routines, objects, and/or components to achieve the same functionality desired.

It will also be appreciated that where the methods and systems of the invention are either wholly implemented by computing system or partly implemented by computing systems then any appropriate computing system architecture may be utilized. This will include stand-alone computers, network computers, dedicated or non-dedicated hardware devices. Where the terms "computing system" and "computing device" are used, these terms are intended to include any appropriate arrangement of computer, information handling system, or information processing hardware capable of implementing the function described.

The above embodiments provide a computationally efficient way to determine infrastructure link path arrangement, in particular an optimal one in view of various constraints and factors, in a semi-automatic or automatic manner. Usually the more the amount of data used, the more accurate the determined result (path arrangement). However, this comes with a computational speed and/or computational resource penalty. One embodiment of the invention applies a multi-resolution or multi-size scaling approach to overcome the problem posed by data size (being too massive). In one example, the multi-resolution or multi-size approach starts from low resolution gridding and suitably spatially averaged data and iteratively and locally refining resolution, only where required, to find the optimal path arrangement at the fidelity achievable for the data. In some implementations parallelization is used to implement the existing provably optimal algorithms and to load the data into the computer for improved efficiency. Domain decomposition method may be applied to realize highly scalable massively parallel computing of a shortest path algorithm on a continuous 2D manifold in 3D space of the modelled geographic terrain. The use of distributed computing enables the loading of massive amount of data into the system. The optimal solutions achieved by parallel processing will help assess and calibrate the multi-resolution algorithms, which may be important when facilities for parallel processing are unavailable. In one example, the optimization is scalable to achieve path planning for infrastructure links that are over 5,000 km long and the resolution of the maps of the earth's surface and existing cables may be at most 30 m distance between any two adjacent nodes. In some implementations the determination will provide one or more path arrangement(s) for least cost based on a given risk (quantified, exact value or range), or for least risk based on a given cost (exact value or range). The determined path arrangement(s) will be at least partly optimal in view of one or more constraints, resulting in a more robust infrastructure link network, which may be deployed, operated, repaired, serviced, or otherwise arranged cost effectively. Human errors in the determination can be reduced.

It will be appreciated by persons skilled in the art that numerous variations and/or modifications may be made to the invention as shown in the specific embodiments without departing from the scope of the invention as broadly described and defined in the claims. The described embodiments of the invention should therefore be considered in all respects as illustrative, not restrictive.

For example, while the method and system of the invention can be applied for determining path arrangement of different types of infrastructure links, including but not limited to: cable (power/data/communication/etc.), pipeline (liquid/gas such as oil/water/fuel), or transportation link (road/railway/walkway). The infrastructure link can be onshore, offshore, or partly onshore and partly offshore. In one example, the path arrangement includes a path network with multiple paths (each may be formed by one or more curved or straight segments, optionally with branching). The paths may be connected. The paths may be connected to an existing infrastructure link network. In another example, the path arrangement includes a single path, e.g., formed by one or more curved or straight segments, optionally with branching. The single path may be a path connected to an existing infrastructure link network, or it may be a new path between two predetermined geographic locations, optionally with predetermined intermediate geographic location(s) through which the path has to pass. In yet another example, the path arrangement includes multiple possible paths (each may be formed by one or more curved or straight segments, optionally with branching). Each of the possible paths may pass through predetermined points/locations.

The invention claimed is:

1. A computer-implemented method for determining a path arrangement of an infrastructure link, comprising:
   receiving one or more inputs each indicative of a constraint;
   processing the one or more inputs and a set of data based on a path arrangement determination model, the set of data including data representing one or more factors affecting the path arrangement, wherein processing comprises:
   a. processing the one or more inputs and the set of data at a first resolution or size based on the path arrangement determination model to determine an intermediate path arrangement; and
   b. after step (a), processing the one or more inputs and at least some of the set of data at a second resolution or size higher than the first resolution or size based on the path arrangement determination model and the intermediate path arrangement; and
   determining, based on the processing, the path arrangement of the infrastructure link.

2. The computer-implemented method of claim 1, wherein the processing comprises: iteratively processing the set of data at increasing resolution or size based on the path arrangement determination model.

3. The computer-implemented method of claim 1, wherein in step (b), the set of data that is processed at the second resolution or size only includes data associated with the determined intermediate path arrangement.

4. The computer-implemented method of claim 3, wherein in step (b), the processing is performed in segments along the determined intermediate path arrangement.

5. The computer-implemented method of claim 1, wherein, prior to the processing, the set of data is at a resolution or size higher than the first resolution or size.

6. The computer-implemented method of claim 1, wherein, prior to the processing, the set of data is at a resolution or size higher than the second resolution or size.

7. The computer-implemented method of claim 1, wherein step (b) determines a further intermediate path arrangement; and the processing further comprises: (c): after step (b), processing the one or more inputs and at least some of the set of data at a third resolution or size higher than the second resolution or size based on the path arrangement determination model and the further intermediate path arrangement.

8. The computer-implemented method of claim 7, wherein in step (c), the set of data that is processed at the second resolution or size only includes data associated with the determined further intermediate path arrangement.

9. The computer-implemented method of claim 8, wherein in step (c), the processing is performed in segments along the further intermediate path arrangement.

10. The computer-implemented method of claim 1, wherein the processing is performed on one or more processors using a parallel processing method.

11. The computer-implemented method of claim 1, wherein the one or more factors includes one or more quantified geographic attributes of a geographic terrain in which the infrastructure link is to be arranged.

12. The computer-implemented method of claim 11, wherein the one or more quantified geographic attributes include topographical attributes or seismological attributes.

13. The computer-implemented method of claim 12, wherein the topographical attributes include elevation attributes and/or bathymetry attributes.

14. The computer-implemented method of claim 12, wherein the seismological attributes represent seismic-activities related hazard.

15. The computer-implemented method of claim 1, wherein the one or more inputs comprise an input indicative of a risk-level related constraint, and the determined path arrangement represents a path arrangement of least cost with respect to a predetermined risk level.

16. The computer-implemented method of claim 1, wherein the one or more inputs comprise an input indicative of a cost related constraint, and the determined path arrangement represents a path arrangement of lowest risk level with respect to a predetermined cost.

17. The computer-implemented method of claim 1, wherein the one or more inputs comprise an input indicative of a protection level related constraint, and the determined path arrangement represents a path arrangement of least cost or least risk-level with respect to a predetermined protection level.

18. The computer-implemented method of claim 1, wherein the path arrangement includes a path network with a plurality of paths or connected paths.

19. The computer-implemented method of claim 1, wherein the path arrangement includes a path network with a plurality of connected paths connected to an existing infrastructure link network.

20. The computer-implemented method of claim 1, wherein the path arrangement includes a single path.

21. The computer-implemented method of claim 1, wherein the infrastructure link comprises a telecommunication cable.

22. The computer-implemented method of claim 1, further comprising:
    presenting the determined path arrangement.

23. A system for determining a path arrangement of an infrastructure link, comprising:
    one or more processors arranged to:
       receive one or more inputs each indicative of a constraint;
       process the one or more inputs and a set of data based on a path arrangement determination model, the set of data including data representing one or more factors affecting the path arrangement, wherein the process comprises:
- a. processing the one or more inputs and the set of data at a first resolution or size based on the path arrangement determination model to determine an intermediate path arrangement; and
- b. after step (a), processing the one or more inputs and at least some of the set of data at a second resolution or size higher than the first resolution or size based on the path arrangement determination model and the intermediate path arrangement; and determine, based on the processing, the path arrangement of the infrastructure link.

24. A non-transitory computer readable medium for storing computer instructions that, when executed by one or more processors, causes the one or more processors to perform a method for determining a path arrangement of an infrastructure link, the method comprising:

receiving one or more inputs each indicative of a constraint;

processing the one or more inputs and a set of data based on a path arrangement determination model, the set of data including data representing one or more factors affecting the path arrangement, wherein processing comprises:
- a. processing the one or more inputs and the set of data at a first resolution or size based on the path arrangement determination model to determine an intermediate path arrangement; and
- b. after step (a), processing the one or more inputs and at least some of the set of data at a second resolution or size higher than the first resolution or size based on the path arrangement determination model and the intermediate path arrangement; and determining, based on the processing, the path arrangement of the infrastructure link.

\* \* \* \* \*